United States Patent [19]
Smith

[11] Patent Number: 5,721,765
[45] Date of Patent: Feb. 24, 1998

[54] PERSONAL IDENTIFICATION NUMBER SECURITY SYSTEM INCORPORATING A TIME DIMENSION

[75] Inventor: David B. Smith, Hinsdale, Ill.

[73] Assignee: Lucent Technologies Inc., Murray Hill, N.J.

[21] Appl. No.: 565,330

[22] Filed: Nov. 30, 1995

[51] Int. Cl.⁶ .................... H04M 11/00; G06K 9/62
[52] U.S. Cl. ............................. 379/93.03; 382/115
[58] Field of Search ........................ 379/95, 67, 88, 379/89, 189, 199, 93.02, 93.03; 382/115, 119, 100, 184; 364/709.05, 709.06, 709.07, 709.11, 709.16, 550; 902/3, 31; 340/825.3, 825.31, 825.34; 380/23, 25, 28

[56] References Cited

U.S. PATENT DOCUMENTS

| | | |
|---|---|---|
| 4,621,334 | 11/1986 | Garcia ........................ 364/550 |
| 4,761,808 | 8/1988 | Howard ........................ 379/95 |
| 4,805,222 | 2/1989 | Young et al. ........................ 340/825.31 |
| 4,998,279 | 3/1991 | Weiss ........................ 379/88 |
| 5,557,686 | 9/1996 | Brown et al. ........................ 382/115 |

*Primary Examiner*—Wing F. Chan
*Attorney, Agent, or Firm*—Dennis J. Williamson

[57] ABSTRACT

The security system includes a time dimension in an alpha-numeric personal identification number (PIN) security system to enhance its security yet maintain the familiar and simple to use PIN system. The alpha-numeric digits comprising the PIN are separated into two or more digit groups that must be entered into the system according to a predefined time sequence in order to positively identify the user and provide security clearance. The time sequence can include time delays between the entry of digit groups or time periods during which the digit groups must be entered.

18 Claims, 2 Drawing Sheets

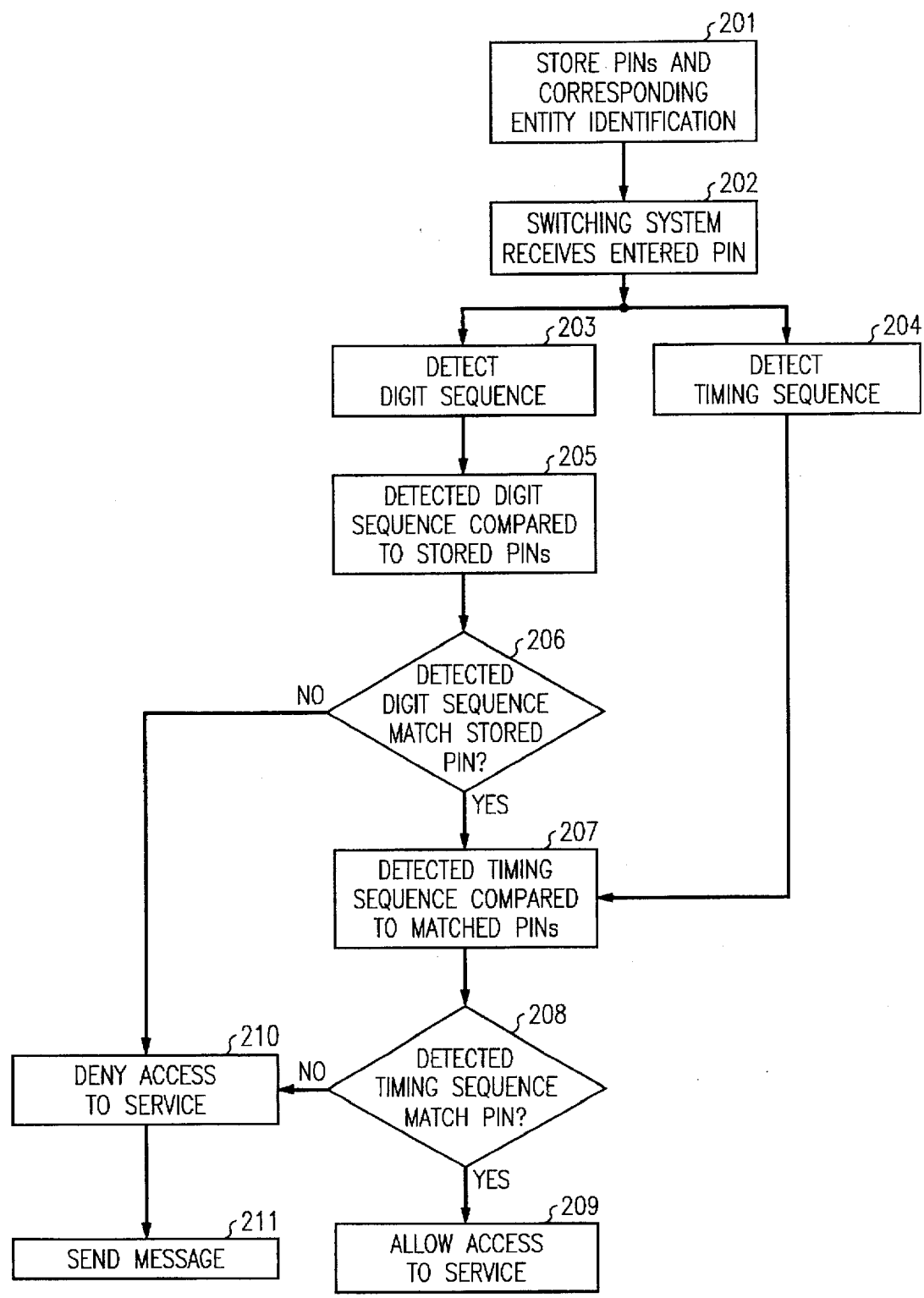

PERSONAL IDENTIFICATION NUMBER SECURITY SYSTEM INCORPORATING A TIME DIMENSION

BACKGROUND OF THE INVENTION

The invention relates, generally, to personal identification numbers used to uniquely identify individuals such as in security clearance systems used for the execution of automated transactions and, more particularly, to a personal identification number that incorporates a time dimension.

It will be appreciated that personal identification numbers (PINs) are presently used to uniquely identify individuals to provide security clearance for the execution of a variety of transactions. One common use of a PIN is to identify a subscriber to a telephone service provider such that the subscriber can obtain telephone service from virtually any telephone and have the charges for the service billed to a desired account. PINs are also used in a wide variety of other transactions where positive identification of the person making the transaction is required. Such transactions include remote computer network logins, access to bank accounts at automatic teller machines, remote credit card charges and the like.

PINs typically consist of a series of alpha-numeric digits that must be entered into the system in a predetermined sequence either manually, such as by a person depressing the keys of a telephone set, or automatically, such as by a computer dialing system. Because it is difficult to remember PINs, these numbers are often printed on a card (such as a calling card for telephone subscribers, an access card for automatic teller machine users or the like) that can be referenced by the individual. With the increased use of such automated transactions, the reliance on PIN security systems has proliferated. Unfortunately, theft of such cards and the corresponding PINs has also become more widespread. It will be appreciated that theft of a valid PIN results in significant financial losses due to the theft of the associated services. Moreover, even where the physical card is not stolen, PINs are often misappropriated by a thief covertly observing the entry of the PIN such as occurs at public telephones. By carefully observing entry of the PIN, a thief can obtain the PIN and later gain access to the associated service.

Thus, a problem in the art exists in that a more secure personal identification system is needed.

SUMMARY OF THE INVENTION

The security system of the invention adds a time dimension to the entry of the alpha-numeric PIN to enhance its security yet maintain the familiar and simple to use PIN system. Specifically, the alpha-numeric digits comprising the PIN are separated into two or more digit groups that must be entered into the system according to a predefined time sequence in order to positively identify the user and provide security clearance. The time sequence can include time delays between the entry of digit groups or time periods during which the digit groups must be entered. It will be appreciated that the digit groups and/or time periods are not designated on the calling or access card such that theft of the card will not provide access to the time dimension element of the PIN. Moreover, use of the time dimension makes theft of the PIN resulting from a would-be thief's covert observation of the entry of the PIN more difficult.

BRIEF DESCRIPTION OF THE DRAWING

FIG. 2 is a flow chart illustrating the operation of the security system of the invention.

DETAILED DESCRIPTION

Figure 1:
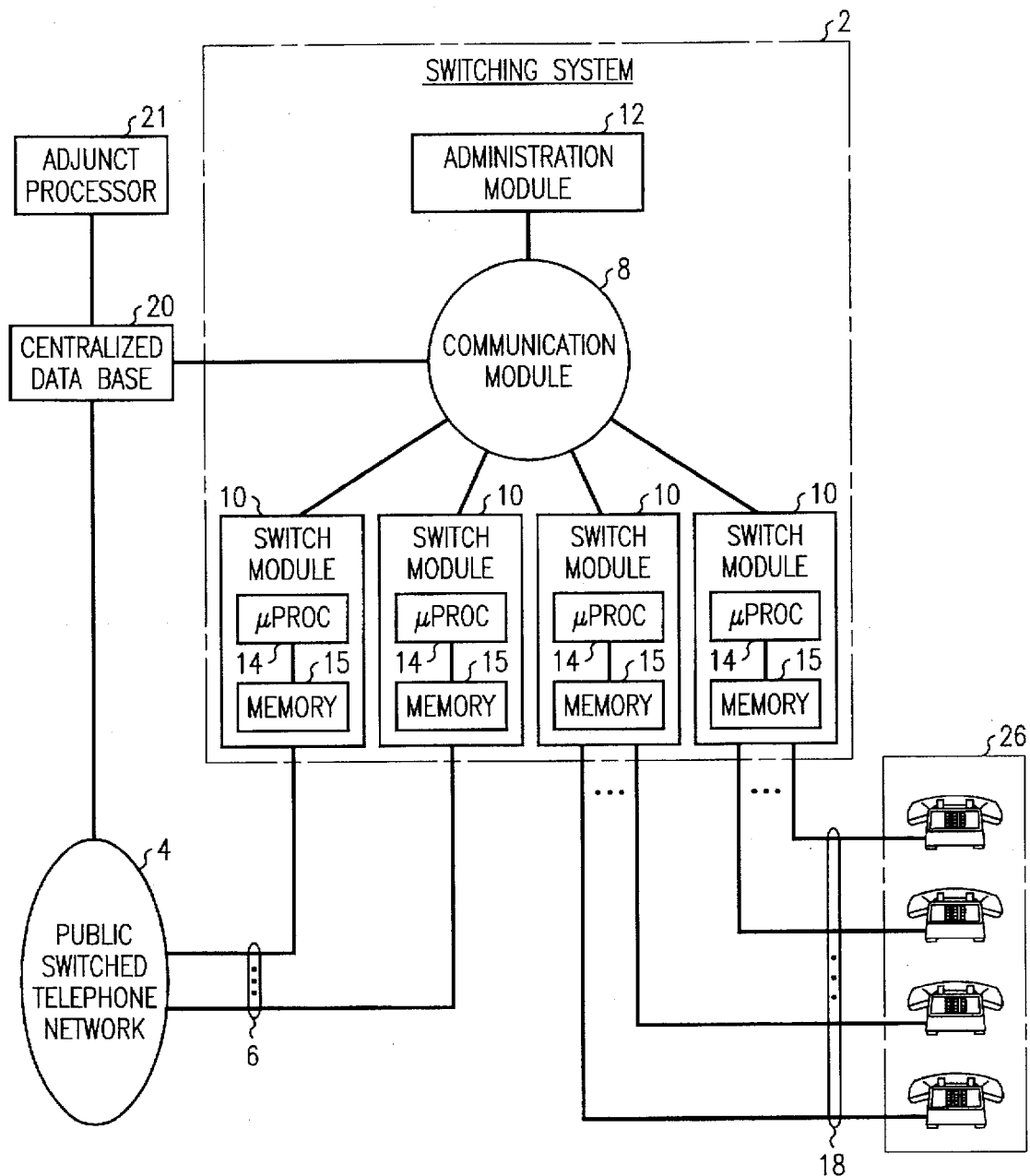
FIG. 1 is a block diagram showing a typical telecommunications system in which the security system of the invention can be used.

Referring more particularly to FIG. 1, the security system of the invention will be described with specific reference to its use in a telecommunications network where a central office switching system 2 is connected to other switches in the public switched network 4 over interoffice trunks 6 as is well known in the art. Switching system 2 can consist of one of the family of 5ESS® switches manufactured and sold by AT&T and described in U.S. Pat. No. 4,592,048 issued to Beckner et al. on May 27, 1986 and in AT&T Technical Journal, Volume 64, No. 6, part 2, pp. 1205–1524, or any other suitable switching system. Switching system 2 operates as is well known in the art to switch voice and data through the network. The architecture of one such switching system is shown and include a communication module 8 forming a hub and having a plurality of switch modules 10, and an administration module 12 emanating therefrom. Communication module 8 is the hub of the switching system and allows communication between the administration module 12 and the switch modules 10. Communication module 8 consists of a message switch that provides the administration module-to-switch module and switch module-to-switch module message communication, and a time multiplexed switch providing the switch module-to-switch module and switch module-to-administration module time slot connection for voice and data communication and clock distribution. Each switch module 6 is controlled by microprocessor 14 and memory 15 and provides call processing, time division switching, and signaling for the lines and trunks to which it is connected. Switch modules 6 interface to the local loops 18 that connect to the customer premise equipment 26 and interface to the trunks 6 that connect to other switches in the network. A centralized data base 20 is accessed by switching system 2 and by other switching systems in the network and maintains a map of PINs to entity identifications and adjunct processor 21 performs the comparison of stored PINs to entered PINs for validating the identities of subscribers.

It will be appreciated that CPEs 26 include public coin or credit operated telephones, telephones located in places of public accommodations such as hotels and telephones in the work place and the home. While CPEs 26 have been shown and described as telephones, it will be appreciated that CPEs could consist of any telecommunications equipment such as terminals, multimedia equipment, wireless handsets or the like. Normally, an individual, business or other entity will subscribe to telephone service at the entity's home or place of business where a particular service provider and level of service are selected and where the bills associated with that service are sent. The place where the entity normally receives its telephone service, whether a home or business, will hereinafter be referred to as the subscriber's "home location." In order to facilitate the making of calls when away from the subscriber's home location, and to provide the subscriber with his or her selected service provider at agreed upon billing rates, it is known in the art to offer a service in which a subscriber can obtain service from virtually any CPE in the network that is the same as the service provided from the subscriber's home location. Typically, such service is provided via calling cards where the subscriber, by entering a calling card number or PIN at the CPE, is provided with substantially the same service as if the call was made from the subscriber's home location and where billing for that service is part of the subscriber's monthly bill to his or her home location. Because the entry of the PIN for security clearance simply requires that the subscriber key in the unique alpha-numeric string of digits, anyone in possession of the PIN can access the subscriber's account and steal the services associated therewith. As used herein the PIN includes the entire calling card number as well as a shorter subset of the calling card number.

To minimize the likelihood of theft, the present invention interposes a time dimension in the inputting of the digits of the PIN. For purposes of explanation, assume that a subscriber's PIN is 123 456 7890. In the prior art systems, the subscriber simply enters this number at a CPE 26 and, provided the entire number is entered within a predetermined maximum time, the identity of the subscriber is validated. Under the system of the invention, the PIN is sectioned into two or more arbitrary digit groups where the entry of the digit groups must be made in a predetermined timing sequence. For example, the PIN set forth above can be separated into a first digit group 12345 and a second digit group 67890. In accordance with the invention, to positively identify the subscriber and provide access to the service, the switching system requires a time delay of a predetermined duration between the subscriber's keyed entry of the two digit groups. For example, the switching system could require a delay of between 3 seconds and 5 seconds or a delay of greater or less than 7 seconds or the like. The entity entering the PIN, therefore, must match not only the alpha-numeric sequence but also a temporal sequence for the entry of those alpha-numeric digits. It will be appreciated that more than two digits groups separated by a plurality of time delays can be used for a single PIN and that the length of the time delay between multiple digit groups could vary even within the same PIN. Thus, even if a would-be thief had access to the alpha-numeric sequence of a PIN number, that number would be of no use without knowledge of the required time delay. Such a system makes the illicit access to a PIN less likely to lead to the theft of the associated services.

It is also contemplated that in addition to requiring predetermined delays or pauses between the entry of digit groups, the timing sequence could require that selected digit groups be entered within a predetermined time frame. In the preceding example, assume that in addition to the delay required between the two digit groups, the first digit group (12345) must be entered in less than three seconds while the second digit group (67890) must be entered between 4 and 8 seconds. The use of pauses between digit groups and time constraints on the entry of digit groups can be used in combination or separately. Moreover, the digit groups can accommodate any number of alpha-numeric digits and as many digits groups can be used as desired. Finally, the length of the time delays and time constraints can vary and can be based on the accuracy of the inputting entity. For example, for manual entry of the PIN, relatively longer time lengths are required to allow for the variations in human performance. Where the PIN is entered by a computer, such as to gain access to a wide area network, the time periods can be very precisely defined. Moreover, while in a preferred embodiment the digit sequence is keyed in manually at a CPE keypad, it will be appreciated that the system of the invention can be used with a speech recognition system where the PIN is entered orally. It is also contemplated that the customer's calling card includes the time delay embedded in the card's magnetic strip such that when the calling card is swipe read, the alpha-numeric digits and time sequence are transmitted. Finally, while the PIN security system of the invention has been specifically disclosed with reference to its use in a telecommunications network, it will be appreciated that the system of the invention can be used in any automated transaction requiring PIN identification.

The operation of the system of the invention will be described with reference to FIG. 2. A plurality of PINs, each one uniquely identifying an entity, are stored in a mapping of PINs to entities in remote data base 20 that can be accessed by the switching system 2 (block 201). A subscriber desiring access to the service enters a PIN incorporating a predetermined time sequence at one of CPEs 26. The switching system 2 receives the entered PIN (block 202) at switch module 6 hosting the CPE and detects digit sequence (block 203) and the time sequence in the digit analyzer (block 204). The detected digit and time sequences are compared to the stored PINs in centralized data base 20 by processor 21 (block 205). If the entered digit sequence matches a stored PIN (block 206), the detected time sequence is compared to the stored time sequence for that digit sequence (block 207). If the entered time sequence matches the timing sequence associated with the entered digit sequence (block 208), the switching system 2 provides service to the CPE (block 209) and bills for the service at the home location of the entity identified by the entered PIN. If the entered PIN does not match either a stored digit sequence (block 206) or the associated timing sequence (block 208), access to the service is denied (block 210). If access to the service is denied, a message can be transmitted to the CPE 26 indicating that access to the service has been denied (block 211). The message can simply indicate that the detected PIN was invalid or the message can more specifically identify that an improper timing sequence or digit sequence was entered. While in the preferred embodiment the timing sequence and digit sequence were detected simultaneously and matched in series, it will be appreciated that the order of detecting and matching the timing and digit sequences can vary. In one preferred embodiment validation of the PIN occurs in the adjunct processor 21 and the remote data base 20; however, the mechanism for validating the PIN can be in the switching system 2. Moreover, where the enhanced PIN security system of the invention is used in a system other than a public switched telecommunications network, the mechanism for validating the PIN will vary and can consist of a processor connected to an automated teller machine or the like via a wide area network. Further, it is contemplated that the subscriber can change the timing sequence upon a request to the system operator such that the same string of alpha-numeric digits can be used with different timing sequences. This allows a subscriber's preferred alpha-numeric digit string to be maintained while varying the PIN via the timing sequence to maintain security.

It is to be understood that the above description is only of one preferred embodiment of the invention. Numerous other arrangements may be devised by one skilled in the art without departing from the scope of the invention. The invention is thus limited only as defined in the accompanying claims.

The invention claimed is:

1. A method for validating the identity of an entity, comprising the steps of:
   storing a plurality of personal identification numbers, said personal identification numbers including a series of digits arranged in at least two digit groups, and storing an arbitrary predetermined timing sequence for each of said plurality of personal identification numbers, said arbitrary predetermined timing sequence being selected independently of personal characteristics of said entity and defining the timing sequence at which said digit groups are to be entered;

assigning one of said plurality of personal identification numbers and the arbitrary predetermined timing sequence for the one of said plurality of personal identification numbers to an entity;

receiving a transmitted series of digits and comparing said transmitted series of digits and the timing sequence at which the series of digits were transmitted to said stored personal identification numbers and said stored arbitrary predetermined timing sequences; and if the transmitted series of digits correspond to particular one of said plurality of personal identification numbers, identifying the entity to which the particular one of said plurality of personal identification numbers is assigned.

2. The method of claim 1, wherein said timing sequence includes a pause of predetermined length between said digit groups.

3. The method of claim 2, wherein said predetermined length includes a span of time having a selected minimum and maximum length.

4. The method of claim 1, wherein said timing sequence includes a predetermined length of time for entering one of said digit groups.

5. The method of claim 4, wherein said predetermined length of time consists of a span of time having a selected maximum and minimum length.

6. The method of claim 1, wherein said transmitted series of digits is received in a switching system.

7. The method of claim 1, further including the step of transmitting said transmitted series of digits from a telephone.

8. The method of claim 1, further including the step of allowing the identified entity access to a transaction.

9. The method of claim 8, wherein said transaction is making a telephone call.

10. In a telecommunications network having a switching system connected to a plurality of CPEs, a method for validating the identity of a subscriber to a service provider, comprising the steps of:

storing in a data base accessible by said switching system a plurality of personal identification numbers including a plurality of series of alpha-numeric digits arranged in at least two digit groups and an arbitrary predetermined timing sequence for each of said plurality of series of alpha-numeric digits, said arbitrary predetermined timing sequence being selected by the service provider and defining the temporal sequence at which said digit groups are to be entered;

assigning ones of said plurality of personal identification numbers to subscribers;

receiving a transmitted series of digits at a means for validating and comparing said transmitted series of digits to said stored personal identification numbers;

detecting the timing sequence at which the transmitted series of digits was received; and if the transmitted series of digits and the timing sequence correspond to particular one of said plurality of personal identification numbers, identifying the subscriber to which the particular one of said plurality of personal identification numbers is assigned.

11. The method of claim 10, further including the steps of providing the identified subscriber with service at a home location and providing the same service to the identified subscriber in response to the step of identifying.

12. An apparatus for validating the identity of an entity, comprising:

means for storing a plurality of personal identification numbers, said personal identification numbers including a series of digits arranged in at least two digit groups, and an arbitrary predetermined timing sequence for each of said plurality of personal identification numbers, said arbitrary predetermined timing sequence being selected independently of characteristics of the entity defining the timing sequence at which said digit groups are to be entered;

means for mapping one of said plurality of personal identification numbers and the predetermined timing sequence for the one of said plurality of personal identification numbers to an entity;

means for receiving a transmitted series of digits at a means for validating and comparing said transmitted series of digits to said stored personal identification numbers and said stored arbitrary predetermined timing sequences;

means for detecting the timing sequence at which the transmitted series of digits was received; and means for identifying the entity to which the particular one of said plurality of personal identification numbers is assigned if the transmitted series of digits correspond to particular one of said plurality of personal identification numbers.

13. The apparatus of claim 12, wherein said timing sequence includes a pause of predetermined length between said digit groups.

14. The apparatus of claim 13, wherein said predetermined length includes a span of time having a selected minimum and maximum length.

15. The apparatus of claim 12, wherein said timing sequence includes a predetermined length of time for entering one of said digit groups.

16. The apparatus of claim 15, wherein said predetermined length of time consists of a span of time having a selected maximum and minimum length.

17. The apparatus of claim 12, wherein said means for validating includes a switching system.

18. The method of claim 1, further including a telephone for transmitting said transmitted series of digits.

* * * * *